US012030334B2

(12) United States Patent
Lintermy et al.

(10) Patent No.: US 12,030,334 B2
(45) Date of Patent: Jul. 9, 2024

(54) WRITING INSTRUMENT

(71) Applicant: Société BIC, Clichy (FR)

(72) Inventors: Julien Lintermy, Clichy (FR); Carine Bethouart, Clichy (FR)

(73) Assignee: SOCIÉTÉ BIC, Clichy (FR)

( * ) Notice: Subject to any disclaimer, the term of this patent is extended or adjusted under 35 U.S.C. 154(b) by 0 days.

(21) Appl. No.: 17/808,633

(22) Filed: Jun. 24, 2022

(65) Prior Publication Data

US 2023/0001736 A1 Jan. 5, 2023

(30) Foreign Application Priority Data

Jun. 30, 2021 (EP) .................................... 21305903

(51) Int. Cl.
*B43K 1/00* (2006.01)
*B43K 5/18* (2006.01)

(52) U.S. Cl.
CPC ............ *B43K 1/003* (2013.01); *B43K 5/1836* (2013.01)

(58) Field of Classification Search
CPC ........... B43K 5/1836; B43K 8/04; B43K 8/06
See application file for complete search history.

(56) References Cited

U.S. PATENT DOCUMENTS 4,973,180 A * 11/1990 Hori ....................... B43K 7/105 401/209
5,967,687 A * 10/1999 Oike ........................ B43K 8/04 401/199
6,302,610 B2 * 10/2001 Mito ........................ B43K 8/04 401/229
6,322,268 B1 * 11/2001 Kaufmann ............... B43K 8/02 401/199
7,147,392 B2 12/2006 Bedhome et al.
7,255,507 B2 8/2007 Lammers et al.
8,087,840 B2 * 1/2012 Yoon ...................... B43K 24/08 401/108
8,348,536 B2 1/2013 Yoon
2005/0191112 A1 9/2005 Yoon
2007/0274765 A1 11/2007 Brand et al.
2019/0193454 A1 6/2019 Suzuki et al.

FOREIGN PATENT DOCUMENTS

EP 1065073 A1 1/2001
EP 3357707 A1 8/2018
EP 3695982 A1 8/2020

(Continued)

OTHER PUBLICATIONS

European Search Report issued in EP 21305903.3 on Dec. 16, 2021 (8 pages).

(Continued)

*Primary Examiner* — David P Angwin
*Assistant Examiner* — Bradley S Oliver
(74) *Attorney, Agent, or Firm* — Bookoff McAndrews, PLLC

(57) ABSTRACT

A free-ink writing instrument mat include a nib drying delay component to prevent drying out of the end of the nib of the writing instrument that is located in the writing ink tank thereof. The nib drying delay component is locally arranged around the end of the nib in a liquid tight manner and configured to locally retain ink therein so as to keep the nib end in contact with locally retained ink.

20 Claims, 2 Drawing Sheets

(56) References Cited

FOREIGN PATENT DOCUMENTS

| | | | |
|---|---|---|---|
| JP | 2010089383 | A | 4/2010 |
| WO | 9817482 | A1 | 4/1998 |
| WO | 2005047016 | A2 | 5/2005 |

OTHER PUBLICATIONS

Pilot Pen. https://www.amazon.in/Pilot-Pen-Mechanism-Hi-TechPoint-V5/dp/B07TYRB8BJ. Amazon.com, Inc., 1996-2022 [retrieved on Jun. 17, 2022]. Retrieved from the Internet (6 pages).

Product Liquimate. https://www.cellowriting.com/product/liquimate. Cello Writing, 2020 [retrieved on Jun. 17, 2022]. Retrieved from the Internet (2 pages).

* cited by examiner

WRITING INSTRUMENT

CROSS-REFERENCE TO RELATED APPLICATION

This application claims priority from European patent application EP21305903.3, filed on Jun. 30, 2021, the entire contents of which being incorporated herein by reference.

TECHNICAL FIELD

The present disclosure relates to the field of writing devices. More specifically, the present disclosure relates to writing devices that dispense volatile inks, such as felt tip markers and the like.

BACKGROUND

The present disclosure relates to free-ink writing instruments that dispense volatile inks, such as felt tip markers, highlighter, non-permanent and permanent markers, and the like. In a free-ink writing instrument, ink is free to move within the instrument tank in accordance with the movements imposed by the user to the instrument. Commonly, felt pens comprise a writing tip in the form of a nib and a cap to close off the nib. The nib is typically kept wet by the ink used for writing. Closing of the nib is be necessary to prevent the solvents of the ink from evaporating and nib from drying out A dried out nib may impair the writing quality of the nib or render the entire felt pen irreversibly useless, thereby shortening the life of the latter. Further, an uncovered nib can lead to unintentional stains on surfaces, e.g. clothes or skin of the user. Also, it may be tedious for the user to recap a felt pen after every use, especially when drawing with multiple colors. Further, a cap may be displaced leading to the nib drying out.

The present disclosure aims to address one or more problems in the prior art.

SUMMARY

In a first aspect, the present disclosure relates to a free-ink writing instrument comprising:

- a tank for storing a writing ink;
- a nib having a first end protruding within the tank for being in contact with writing ink and a second opposite end located outside the tank for dispensing writing ink outside the writing instrument, characterized in that the writing instrument further comprises a nib nib drying delay component that is locally arranged around the first end of the nib in a liquid tight manner and configured to locally retain ink therein so as to keep the first nib end in contact with locally retained ink whatever the spatial position of the writing instrument According to this first aspect, the nib nib drying delay component located around the first nib end may retain ink locally in contact with the first nib end so as to keep it wet as long as possible, thereby delaying drying of the nib and improving cap-off time performances of the writing instrument when the latter is provided with a cap. When the writing instrument is retractable and the second opposite nib end is in a retracted position (the writing instrument has no cap), drying of the nib is also delayed thanks to the above configuration.

In some embodiments, the nib nib drying delay component is located in a first part of the tank and is further configured to allow ink stored in a second part of the tank to flow through the nib nib drying delay component when the writing instrument is moved toward an appropriate position.

In some embodiments, the nib nib drying delay component forms a local ink reservoir around the first nib end.

In some embodiments, the nib drying delay component comprises a surrounding wall that extends between the first nib end and a peripheral wall of the tank so as to form an ink trap in a first portion of the surrounding wall that is adjacent the first nib end.

In some embodiments, the surrounding wall comprises a second portion that is located farther from the first nib end than the first portion of the surrounding wall, the first or second portion having openings configured to allow ink stored in the tank to flow through these openings and enter into the ink trap when the writing instrument is moved toward an appropriate position.

In some embodiments, micro-valves are arranged in the openings so as to enable therethrough a flow of stored ink in a first direction into the ink trap when the writing instrument is moved toward an appropriate position and prevent ink from flowing out in a second opposite direction.

In some embodiments, the surrounding wall has a substantially funnel shape with a narrow portion in contact with the first nib end and a wide portion in contact with the peripheral wall of the tank, the funnel-shaped surrounding wall flaring out towards the second nib end.

In some embodiments, the nib drying delay component comprises a foamed member that surrounds the first nib end in a liquid tight manner therewith, the foamed member being formed of a foamed material that is configured to be filled with ink stored in the tank when the writing instrument is moved toward an appropriate position.

In some embodiments, the foamed member has a transverse dimension that extends in a transverse direction relative to a longitudinal direction extending between the first and second nib ends, the transverse dimension being chosen so that, in a horizontal position of the writing instrument, ink that is stored in the tank can fill the foamed material of the foamed member.

In some embodiments, the foamed material of the foamed member has a capillarity power that is less than the capillarity power of the nib.

In some embodiments, the foamed member is substantially ring-shaped. However, other shapes may be envisaged, such as square-shaped or triangular-shaped.

In some embodiments, the nib extends axially between both first and second ends, the first nib end comprising an axial terminating portion that faces a bottom of the tank and a circumferential portion that faces a peripheral wall of the tank.

In some embodiments, the nib drying delay component is locally arranged around the circumferential portion of the first nib end in a liquid tight manner therewith while leaving unobstructed the axial terminating portion thereof.

DETAILED DESCRIPTION

Hereinafter, a detailed description will be given of the present disclosure. The terms or words used in the description and the aspects of the present disclosure are not to be construed limiting as only having common-language or dictionary meanings and should, unless specifically defined otherwise in the following description, be interpreted as having their ordinary technical meaning as established in the relevant technical field. The detailed description will refer to specific embodiments to better illustrate the present disclosure, however, it should be understood that the presented disclosure is not limited to these specific embodiments.

Figure 1:
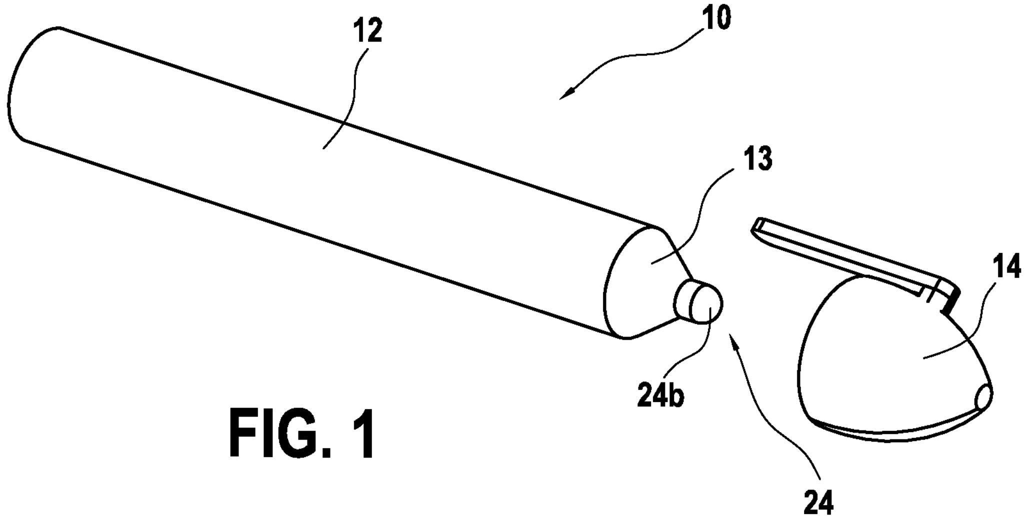
FIG. 1 shows an example of a writing instrument according to the present disclosure.

In a first exemplary embodiment, the present disclosure relates to a writing instrument. An example of a writing instrument according to the present disclosure is described below with reference to FIG. 1. The writing instrument 10 may comprise a tubular body 12. The tubular body may be a unitary body, or it may comprise multiple components. In FIG. 1, the tubular component is made of multiple components and comprises a tip component 13 comprising a writing orifice which is located at the distal end of the tip component 13. The writing instrument 10 may further comprise in the tubular body a tank (not shown in FIG. 1) for storing a writing ink which may be arranged proximally to the writing orifice within or as part of the tubular body 12. The writing instrument is a free ink instrument wherein the writing ink is free to circulate or flow in the tank. In other words, the writing ink circulates instantaneously on either side of the tank, e.g. as a result of gravity. In particular, it is to be understood that the writing ink is able to move within the tank when the writing instrument is handled or moved by a user. The writing instrument may be a marker, a felt pen, a highlighter, a permanent or non-permanent marker or any other type of writing instrument.

The writing instrument 10 may further comprise a nib 24 which may be in fluid communication with the tank. In the exemplary embodiment, the fluid communication may be established by the nib 24 comprising a fibrous or porous part which extends into the tank and is configured to transport ink from the tank by capillarity. In some embodiments, one or more intermediate components may be located between the nib and the tank containing free ink.

In some embodiments, the nib 24 of the writing instrument may be in a fixed position within the tubular body 12 with the writing end of the nib permanently protruding through the writing orifice as illustrated in FIG. 1. Such a writing instrument may be equipped with a cap 14 that is provided to close off the writing end nib after use of the instrument (in FIG. 1 the cap 14 is represented at a distance of the the writing end of the nib).

In some other embodiments not illustrated, the nib may be configured to be axially translatable within the tubular body of the writing instrument, in a known manner, between a first retracted position in which the nib is positioned within the tubular body and not protruding through the writing orifice and a second extended position in which the nib protrudes through the writing orifice. In such embodiments (retractable system), the writing instrument does not need any cap.

Figure 2:
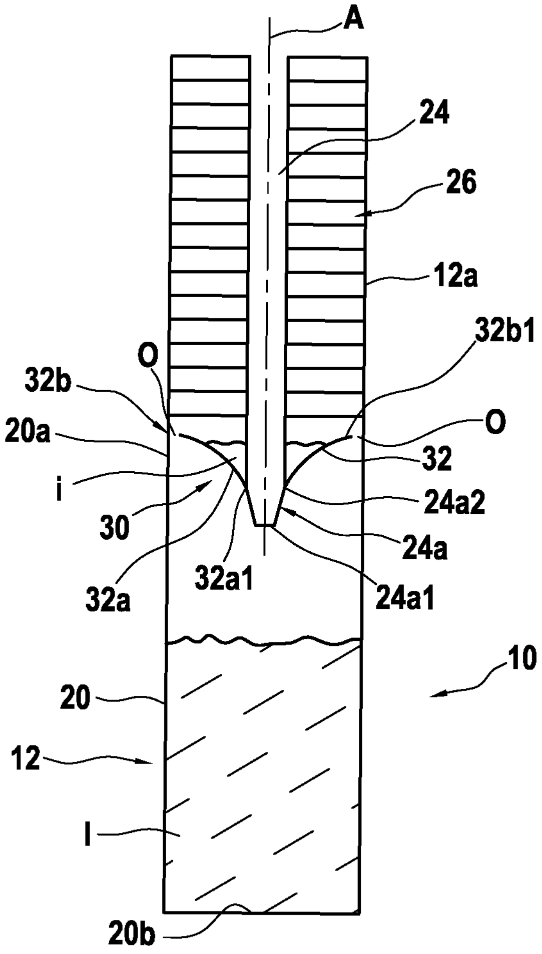
FIG. 2 shows an exemplary embodiment of a nib drying delay component that may be used in the writing instrument of FIG. 1.

As illustrated in FIG. 2, a first exemplary embodiment of a writing instrument according to the present disclosure shows a schematic partial axial cross section of the rear part of the tubular body 12 of FIG. 1 encasing the writing ink tank 20 storing writing ink I.

The nib 24 may have an end 24*a*, called a first end, which protrudes within the tank 20. The protruding first nib end 24*a* is in contact with writing ink stored within the tank when the writing instrument 10 is filled with ink before any use. In FIG. 2, the writing instrument 10 has already been used and part of the ink originally stored in the tank has been dispensed outside the instrument, thereby showing a tank filled in part with ink I. The first nib end 24*a* is left exposed to air and is no longer in permanent contact with ink, which may entail risks of drying of the nib. The nib 24 may have a second opposite end 24*b* located outside the tank for dispensing writing ink outside the writing instrument. This second nib end 24*b* is illustrated in FIG. 1 in the exemplary embodiment but not in FIG. 2 which only illustrates the part of the nib 24 which is located in the rear part of the tubular body 12. In this Figure, the writing instrument 10 is in a vertical position with the second nib end 24*b* and the writing orifice of the instrument of FIG. 1 in an upper position, the first nib end 24*a* being in a lower position.

The nib 24 may extend axially between both first end 24*a* and second end 24*b* along a longitudinal axis A which here coincides with the longitudinal axis of the tubular body 12, 14, which may differ depending on the writing instrument configurations.

As illustrated in FIG. 2, the writing instrument 10 may comprise in a known manner a baffle or buffer system or arrangement 26 through which the nib 24 axially extends. Baffle or buffer system/arrangement 26 may surround the nib 24 along part of its length and extend transversally through a peripheral wall 12*a*, e.g. cylindrical wall, of the tubular body 12. Such an arrangement enables ink flow regulation towards the front part of the tubular body. Other configurations where nib and baffle/buffer are arranged in series may also be envisaged.

The writing instrument 10 may further comprise a nib drying delay component 30 located in a first part of the tank 20 and locally arranged around the protruding first end 24*a* of the nib in close contact therewith so as to provide liquid tight sealing between the first nib end 24*a* and the surrounding nib drying delay component 30.

The nib drying delay component 30 may be configured through its shape to retain ink locally around the first nib end 24*a* and in contact therewith (in other words, the nib drying delay component forms a local ink reservoir or ink trap around the first nib end and that is separate from the remaining second part of the tank where the ink is stored) so as to maintain a permanent contact with ink, thereby maintaining the first nib end 24*a* wet as long as possible to avoid drying out of the latter and therefore improving cap-off time performances of the writing instrument. To be noted that by wetting the nib with ink on the rear side (first nib end), the second nib end will be fed with ink (by capillarity) so as to prevent drying.

The locally retained ink around the first nib end 24*a* (in the first part of the tank) may be useful whatever the spatial position of the writing instrument. In particular, it is useful when the first nib end 24*a* is no longer in contact with ink I (as shown in the upright position of FIG. 2) due to the already dispensed ink. This may also occur when the writing instrument 10 is in a horizontal position and the ink volume that remains stored in the second part of the tank is no longer sufficient for the first nib end 24*a* to be in contact with the latter.

The nib drying delay component 30 may comprise a surrounding wall 32 (e.g. in plastic or metal) that extends between the first nib end 24*a* and a peripheral wall 20*a* (e.g. cylindrical wall) of the tank 20 so as to form an ink trap in a first portion 32*a* of the surrounding wall that is adjacent the first nib end 24*a*. A volume of ink i may be locally trapped and retained within the area surrounding the first nib end 24*a* and enclosed by the first portion 32*a* as shown in FIG. 2. The surrounding wall may be a separate component which is added in the tank during the assembly of the writing instrument or be part of the molding process of the tank itself. The wall 32 may more specifically be rigid so as to keep its shape and ensure the ink trapping function.

The surrounding wall 32 may further comprise a second wall portion 32*b* that is located farther from the first nib end 24*a* than the first wall portion 32*a* and that transversally extends to the peripheral wall 20*a*. The second wall portion 32*b* may be provided with openings, here peripheral openings O, e.g. regularly distributed along a circumference of the second wall portion 32*b*. These openings O may be configured to allow ink I stored in the second part of the tank to flow through these openings and ingress into the space delimited by the wall 32, the rear part of the baffle or buffer system/arrangement 26 (other arrangements may be provided) and therefore into the ink trap. This ink flow may be made possible when the writing instrument 10 is moved to or toward an appropriate position, i.e. either in a horizontal position when the volume of ink I is sufficient or when the tank is above first nib end 24*a* to adopt a writing position (and the latter is above the second nib end 24*b*). A volume of ink i may therefore be trapped as explained above and may subsequently be available as a local ink reservoir when the writing instrument is returned to a position where the tank is no longer above the first nib end 24*a*, but at the same level or even at a lower position.

In the exemplary embodiment of FIG. 2, the surrounding wall 32 may have a substantially funnel shape with a narrow portion 32*a*1 in contact with the first nib end 24*a* and a wide portion 32*b*1 in contact with the surrounding peripheral wall 20*a* of the tank. As shown in FIG. 2, the funnel-shaped surrounding wall 32 flares out from the first nib end 24*a* along longitudinal axis A, i.e. towards the front part of the tubular body and the second nib end 24*b* (not represented in FIG. 2). The surrounding wall 32 may be substantially curved with a concavity oriented towards the rear or second part of the tank. This concave shape makes it possible to maintain a certain amount of free ink in permanent contact with the nib (to keep it wet). Such a feature makes it possible to allow a greater surface of contact between ink and the nib. This feature provides greater efficiency when the the writing instrument is in nib up position (vertical or not). To be noted that other surrounding wall shapes may alternately be envisaged (e.g. a frusto conical shape or a convex shape to provide the same or likewise advantages).

As more particularly illustrated in FIG. 2, the first nib end 24*a* may comprise an axial terminating portion 24*a*1 that faces the bottom 20*b* of the tank 20 and a circumferential portion 24*a*2 that faces the surrounding peripheral wall 20*b* of the tank. The axial terminating portion 24*a*1 may be connected to the circumferential portion 24*a*2 by a bevelled portion.

The nib drying delay component 30, here the surrounding wall 32, may be locally arranged around the circumferential portion 24*a*2 of the first nib end 24*a* in a liquid tight manner therewith while leaving free or unobstructed the axial terminating portion 24*a*1 which can therefore be directly in contact with ink, either before the first use (filled tank) or when the writing instrument is moved with its rear part at a upper position than its front part.

Figure 3:
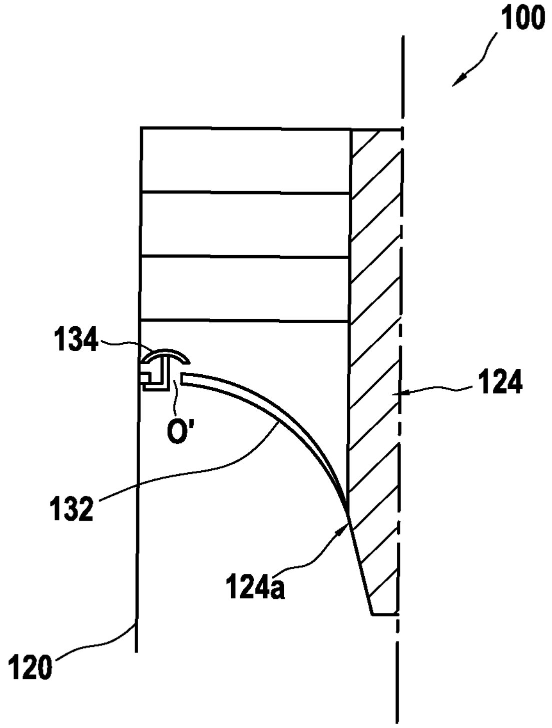
FIG. 3 shows an enlarged partial view of a variant embodiment of FIG. 2.

FIG. 3 illustrates a variant embodiment 100 wherein the ink that has been trapped around the first nib end 124 a of a first nib 124 is being prevented from flowing out through the openings O' of the surrounding wall 132 (toward the second part of the tank 120) when the writing instrument is being moved.

In this respect, micro-valves 134 may be arranged in the openings O' (mounted on the surrounding wall 132) so as to enable therethrough a flow of stored ink in a first direction into the ink trap when the writing instrument is moved to or toward an appropriate position (as explained above to create a local ink reservoir around the first nib end 124*a*). This is made possible thanks to the ink pressure applied on the micro-valves. These micro-valves prevent ink from flowing out of the ink trap through these openings in a second opposite direction when the writing instrument is being moved to a position where the first nib end is at the level of the tank or at an upper position than the tank (nib up position) by virtue of gravity and/or weight of ink stored in the ink trap. By way of example, The micro-valves which can be used are conventional ones, such as umbrella-type valves, usually made of elastomeric materials. More generally, the choice of a micro-valve may be done in a way that it can be opened thanks to low pressure variation (a few millibars considering that the height of ink in a writing instrument is generally a few centimeters). It can also be a simple flap working with gravity (closed when writing instrument is in nib up position and opened thanks to the force applied by the ink column when the writing instrument is in nib down position).

Alternatively, the openings O' equipped with micro-valves or the like (avoiding ink to flow back to the tank) may be arranged in the first portion of the wall 132 that is closer to the nib end portion than the second portion of the wall where the micro-valves or the like are provided in FIG. 3 (close to the peripheral wall of the tank). The configuration of FIG. 3 (with the openings O' close to the tank peripheral wall) is particularly effective when the writing instrument (e.g. marker) is in horizontal position and the tank contains a low quantity of ink. This advantage also applies to the FIG. 3 embodiment.

Figure 4:
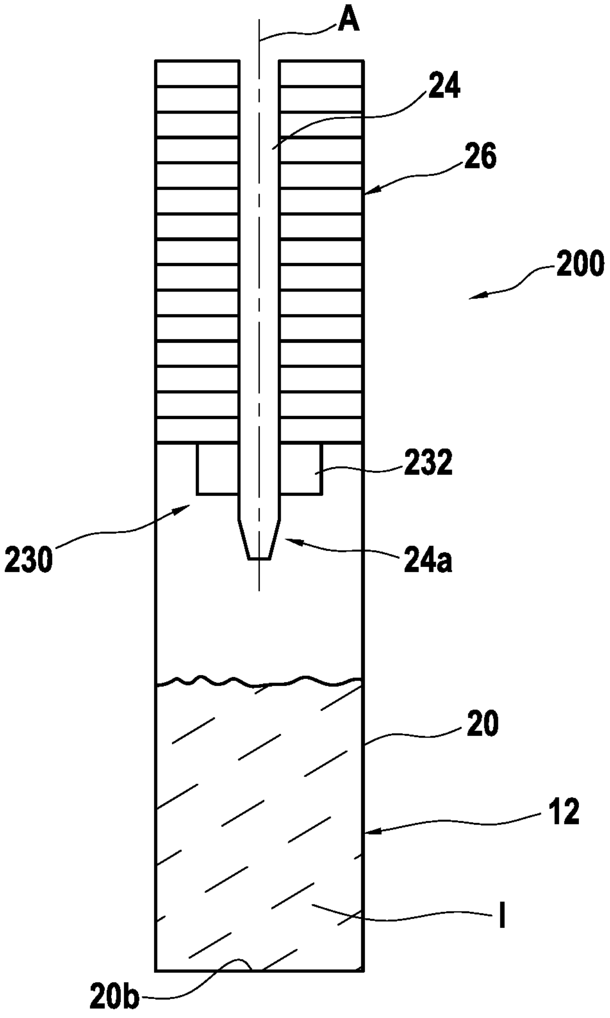
FIG. 4 shows another exemplary embodiment of a nib drying delay component that may be used in the writing instrument of FIG. 1.

A second exemplary embodiment illustrated in FIG. 4 takes over the same principle as described above of creating a local ink reservoir (ink trap) around the first nib end that protrudes in the ink tank so as to make ink available around the first nib end and in contact therewith in a permanent manner (to maintain the first nib end in wet condition), even when the writing instrument is in a position where the writing ink stored in the tank is no longer in contact with the first nib end (the trap with foamed material has the advantage of being efficient whatever the writing instrument position). Cap-off time is therefore improved due to permanent contact between the first nib end and trapped ink as for the embodiments of FIGS. 2 and 3 of which the features and advantages are taken over here, except when technically incompatible with each other. Only the nib drying delay component of the writing instrument differs from the FIGS. 2 and 3 exemplary embodiments. The corresponding elements keep their own references.

As schematically represented in FIG. 4, the writing instrument 200 comprises a nib drying delay component 230 which may comprise a foamed member 232 that surrounds the first nib end 24*a* in a liquid tight manner therewith. The foamed member may be tightly adjusted around the first nib end 24*a*.

The foamed member 232 may be formed of a foamed material that is configured to be filled with ink stored in the tank 20 when the writing instrument 200 is moved to or toward an appropriate position i.e. either in a horizontal position when the volume of ink is sufficient or when the tank 20 is above first nib end 24*a* to adopt a writing position (and the latter is above the second nib end 24*b* of FIG. 1). A volume of ink may therefore be trapped within the foam and may subsequently be available as a local ink reservoir when the writing instrument is returned to a position where the tank 20 is no longer above the first nib end 24*a*, but at the same level or even at a lower position. To be noted that at the very first use of the writing instrument 200 the level of ink within the tank is generally sufficient for the first nib end 24*a* to remain submerged in the stored ink. At the very first use, the foamed member 232 which may be located above the level of ink stored in the tank (depending on the product configuration) may be soaked with ink due to the writing instrument handling during assembly, co-packing and/or transportation.

The foamed member has retention properties that allow to retain/store ink locally around the first nib end 24*a* and maintain the latter wet. The retained/stored ink may be delivered or dispensed to the first nib end thanks to its capillarity power.

It may be preferable that the capillarity power of the foamed member 232 be less than the capillarity power of the nib 24 so as to permit a controlled transfer of ink from the foam to the nib over time.

By way of example, the foamed material may be a filler with polyester fibers and a plastic wrap (e.g. made of polypropylene), or a polyester or polyurethane based foam. The foamed material may also be a porous component with polyamide or polypropylene fibers.

In some embodiments, the foamed member 232 may have a transverse dimension extending transversally relative to the longitudinal axis A. that may be chosen so that, in a horizontal position of the writing instrument 200, ink I that is stored in the tank 20 can fill the foamed material of the foamed member 232. This dimension (e.g. diameter for a ring) may be adjusted, e.g. increased, so as to increase the chances for the foamed member to capture ink and be filled therewith when the writing instrument 200 is horizontal and the volume/level of ink in the tank has decreased since the very first use of the instrument (fully filled tank). For example, the transverse dimension of the foamed member 232 may substantially correspond to the inner diameter of the tank.

In some embodiments, the foamed member may be substantially ring-shaped as schematically illustrated in FIG. 4 for the sake of design simplicity. However, other alternative shapes may be envisaged depending on the circumstances.

In some other embodiments not depicted, the writing instrument of the present disclosure may be provided both with a nib drying delay component 30 and a nib drying delay component 230. In such an embodiment, the nib drying delay component 30 (e.g. surrounding wall 32) may be provided around the foamed member 232 of the nib drying delay component 230 of FIG. 4 for example (foamed member located in the ink trap formed by the surrounding wall). This arrangement may provide additional amount of ink in contact with the nib and therefore may further improve the cap-off time of the writing instrument.

In some other embodiments not depicted, the writing instrument of the present disclosure may be provided both with a nib drying delay component 30 and a nib drying delay component 230. In such an embodiment, the foamed member 232 of the nib drying delay component 230 of FIG. 4 for example may be located close to the terminating portion of the first nib end and the nib drying delay component 30 (e.g. surrounding wall 32) may be provided around the portion of the first nib end that is farther from the terminating portion of the latter so as to be located downstream the foamed member 232 when considering the flow of ink from the tank towards the nib (foamed member located outside the ink trap formed by the surrounding wall).

In some other embodiments not depicted, the systems as described and illustrated in FIGS. 2 to 4 may be equipped with an actuation mechanism, springs etc. in order to be used in a retractable free-ink writing instrument.

Although the preferred embodiments of the present disclosure have been disclosed for illustrative purposes, those skilled in the art will appreciate that various modifications and alterations are possible, without departing from the spirit of the present disclosure. It is also to be understood that such modifications and alterations are incorporated in the scope of the present disclosure and the accompanying claims.

The invention claimed is:

1. A free-ink writing instrument comprising:

a tank for storing a writing ink, the tank having a bottom surface and a peripheral wall extending from the bottom surface;

a nib having a first end protruding within the tank for being in contact with writing ink and a second opposite end located outside the tank for dispensing writing ink outside the writing instrument, the first end comprising axial terminating portion that faces a bottom of the tank, wherein a surface of the axial terminating portion that is closest to the bottom of the tank is exposed wherein the writing instrument further comprises a nib drying delay component that is locally arranged around the first end of the nib in a liquid tight manner and configured to locally retain ink therein so as to keep the first nib end in contact with locally retained ink whatever the spatial position of the writing instrument, wherein the nib drying delay component comprises a surrounding wall that extends between the first nib end and the peripheral wall of the tank so as to form an ink trap in a first portion of the surrounding wall that is adjacent the first nib end, and the surrounding wall comprises a second portion that is located farther from the first nib end than the first portion of the surrounding wall, the first or second portion having an opening configured to allow ink stored in the tank to flow through the opening and enter into the ink trap when the writing instrument is moved toward an appropriate position, wherein a micro-valve is arranged in the opening so as to enable therethrough a flow of stored ink in a first direction into the ink trap when the writing instrument is moved toward an appropriate position and prevent ink from flowing out in a second opposite direction when the writing instrument is moved to a position where the first nib end is at the level of the tank above the tank.

2. The free-ink writing instrument according to claim 1, wherein the nib drying delay component is located in a first part of the tank and is further configured to allow ink stored in a second part of the tank to flow through the nib drying delay component when the writing instrument is moved toward an appropriate position.

3. The free-ink writing instrument according to claim 1, wherein the nib drying delay component forms a local ink reservoir around the first nib end.

4. The free-ink writing instrument according to claim 1, wherein the surrounding wall has a substantially funnel shape with a narrow portion in contact with the first nib end and a wide portion in contact with the peripheral wall of the tank, the funnel-shaped surrounding wall flaring out towards the second nib end.

5. The free-ink writing instrument according to claim 1, wherein the nib drying delay component comprises a foamed member that surrounds the first nib end in a liquid tight manner therewith, the foamed member being formed of a foamed material that is configured to be filled with ink stored in the tank when the writing instrument is moved toward an appropriate position.

6. The free-ink writing instrument according to claim 5, wherein the foamed member has a transverse dimension that extends in a transverse direction relative to a longitudinal direction extending between the first and second nib ends, the transverse dimension being chosen so that, in a horizontal position of the writing instrument, ink that is stored in the tank can fill the foamed material of the foamed member.

7. The free-ink writing instrument of claim 5, wherein the foamed material of the foamed member has a capillarity power that is less than the capillarity power of the nib, and wherein the foamed member is substantially ring-shaped, square-shaped or triangular-shaped.

8. The free-ink writing instrument according to claim 1, wherein the nib extends axially between both first and second ends, the first nib end comprising an axial terminating portion that faces a bottom of the tank and a circumferential portion that faces a peripheral wall of the tank.

9. The free-ink writing instrument according to claim 8, wherein the nib drying delay component is locally arranged around the circumferential portion of the first nib end in a liquid tight manner therewith while leaving unobstructed the axial terminating portion thereof.

10. The free-ink writing instrument according to claim 1, wherein the writing ink is able to move within the tank when the writing instrument is handled or moved by a user.

11. The free-ink writing instrument according to claim 1, wherein the nib is configured to be axially translatable within a tubular body of the writing instrument, between a first retracted position in which the nib is positioned within the tubular body and not protruding through a writing orifice and a second extended position in which the nib protrudes through the writing orifice.

12. The free-ink writing instrument of claim 1, wherein the opening and the micro-valve are disposed longitudinally between the first nib end and the second nib end.

13. The free-ink writing instrument of claim 1, wherein the micro-valve comprises a flap movable by gravity between an open configuration and a closed configuration, wherein:

1) When the nib is disposed above the tank, the flap urged to the closed configuration by gravity to prevent flow of ink from the ink trap into the tank; and 2) When the nib is disposed below the tank, the flap is urged to the open configuration by gravity to permit flow of ink from the tank to the ink trap.

14. A free ink writing instrument comprising:

a tank for storing a writing ink;

a nib having a first end protruding within the tank for being in contact with writing ink and a second opposite end located outside the tank for dispensing writing ink outside the writing instrument;

a nib drying delay component surrounding the first end of the nib in a liquid tight manner that retains ink to keep the first nib end in constant contact with the retained ink, wherein the nib drying delay component comprises a surrounding wall that is substantially curved with a concavity oriented towards a rear of the tank, the wall extending between the first nib end and a peripheral wall of the tank so as to form an ink trap in a first portion of the surrounding wall that is adjacent the first nib end, and wherein a narrow portion of the surrounding wall is in contact with the first nib end and a wide portion of the surrounding wall is in contact with the peripheral wall of the tank.

15. The free ink writing instrument of claim 14, wherein the nib extends through a baffle, the baffle surrounding the nib along at least a portion of its length, and wherein the baffle enables ink flow regulation towards a front part of a tubular body of the writing instrument.

16. The free ink writing instrument of claim 15, wherein the nib and baffle are arranged in series.

17. A free-ink writing instrument comprising:

a tank for storing a writing ink;

a nib having a first end protruding within the tank for being in contact with writing ink and a second opposite end located outside the tank for dispensing writing ink outside the writing instrument, characterized in that the writing instrument further comprises a nib drying delay component that is locally arranged around the first end of the nib in a liquid tight manner and configured to locally retain ink therein so as to keep the first nib end in contact with locally retained ink whatever the spatial position of the writing instrument, wherein the nib drying delay component comprises a surrounding wall that extends between the first nib end and a peripheral wall of the tank so as to form an ink trap in a first portion of the surrounding wall that is adjacent the first nib end, and the surrounding wall has a substantially concave funnel shape, from a perspective exterior to the nib drying delay component, with a narrow portion in contact with the first nib end and a wide portion in contact with the peripheral wall of the tank, the concave surrounding wall flaring out towards the second nib end, wherein the concave surrounding wall includes an opening located in the wide portion, the opening being configured to allow ink to travel from the tank, beyond the nib drying delay component, to the locally retained ink.

18. The free-ink writing instrument of claim 17, further comprising micro-valves formed in a peripheral section of the surrounding wall.

19. The free-ink writing instrument of claim 18, wherein the micro-valves are umbrella type valves.

20. The free-ink writing instrument of claim 18, wherein the micro-valves are formed of an elastomeric material.

* * * * *